United States Patent

Szenger

[11] Patent Number: 4,515,415
[45] Date of Patent: May 7, 1985

[54] PLAIN BEARING

[75] Inventor: Franz Szenger, Konigsbronn, Fed. Rep. of Germany

[73] Assignee: Carl-Zeiss-Stuftung, Heidenheim/Brenz, Oberkochen, Fed. Rep. of Germany

[21] Appl. No.: 537,022

[22] Filed: Sep. 29, 1983

[30] Foreign Application Priority Data

Oct. 7, 1982 [DE] Fed. Rep. of Germany ....... 3237085

[51] Int. Cl.$^3$ .................... F16C 29/02; F16C 29/06
[52] U.S. Cl. ................................. 308/6 R; 308/3 R
[58] Field of Search ............... 308/3 R, 6 R, 202, 207, 308/184 R, 236, 4 R; 384/548, 565, 535

[56] References Cited

U.S. PATENT DOCUMENTS

| 4,040,678 | 8/1977 | Rote et al. | 308/6 R |
| 4,378,890 | 4/1983 | Empson | 308/3 R |
| 4,385,704 | 5/1983 | Spain et al. | 308/3 R |

FOREIGN PATENT DOCUMENTS 1497258  3/1969  Fed. Rep. of Germany .

Primary Examiner—Lenard A. Footland
Attorney, Agent, or Firm—Hopgood, Calimafde, Kalil, Blaustein & Judlowe

[57] ABSTRACT

The invention contemplates a plain bearing which is guided on a prismatic rail (9) and in which the bearing elements are rollers (25 to 28) having longitudinal axes oriented parallel to the guidance direction. These rollers (25 to 28) are resiliently retained on the guided part (4), as by means of an adhesive (33), thereby permitting all rollers to have an incrementally small range of rotational displaceability.

In the circumstance of force which results in twisting of the bearing portion about the guide axis, the bearing members (25, 28) can roll within small ranges on the guide (9). After eliminating such a force, the bearing returns to its basic angular position with high precision, by reason of the relatively low coefficient of rolling friction, as compared with the relatively high coefficient sliding friction which would otherwise characterize the displacement.

6 Claims, 6 Drawing Figures

PLAIN BEARING

BACKGROUND OF THE INVENTION

The invention relates to a plain bearing for a part which is guided longitudinally on a prismatic guide rail. And copending application Ser. No. 445,536, filed Nov. 30, 1982, is a related case to which reference is made for background purposes.

Primarily, plain bearings are used for longitudinal guides since they have the advantage, over anti-friction bearings or air bearings, of being of simple construction. Also, in a few cases, a plain bearing may be specifically selected to achieve a feature which is generally undesired. Thus, a self-locking plain bearing is well suited for guiding the displaceable part of chucking devices, for example, the arm of a center cradle, since in such case there is no need for separate clamping screws to secure the part after clamping the workpiece.

However, plain bearings have a disadvantage which limits their use in guides which must serve with great precision, in that, once the bearing has been clamped by constraining forces which act (tangentially and perpendicularly to the direction of guidance) on the bearing, the bearing no longer returns precisely to its angular-zero position, due to relatively great sliding friction between bearing and guide. If such a bearing is used to guide the arm of a center cradle, in the circumstance in which the offset end of the arm mounts a measurement-reference point to be reproduced with high precision in its position in space, then the length of the arm magnifies the degrading effect of such friction on the accuracy of positioning the reference point. And one cannot always remedy the situation by increasing the longitudinal base, i.e., in the guidance direction.

From West German published patent application No. OS 1,497,258, a carriage guide is known in which the guided part relies on engagement with two cylindrical slide members on the guide rail. The slide members engage in V-grooves in the guided part and have their longitudinal axes aligned parallel to the direction of guidance. But this bearing also, due to its angular position, cannot satisfy demands for increased precision, since the slide members always engage the two walls in their respective grooves and thus cannot be turned without sliding friction.

BRIEF STATEMENT OF THE INVENTION

The object of the present invention is to create a plain bearing for a part which is guided longitudinally on a prismatic guide rail and has a high degree of reproducibility of its position with the smallest possible guidance base.

The invention achieves this object, in a plain bearing for a part guided longitudinally on a prismatic guide rail, wherein cylindrical rollers are used (at least in part of the bearing) as bearing elements, with longitudinal axes of the rollers aligned parallel to the longitudinal direction of guidance, and with means so resiliently mounting the rollers to the guided part as to establish fixed restraint in the direction perpendicular to the direction of guidance while permitting limited rotary displacement of the rollers.

This construction achieves the result that, between the prismatic guide and the guided part, rolling friction replaces the sliding friction which otherwise occurs in customary plain bearings, in the circumstance of tangential forces perpendicular to the direction of guidance. The result is that, by effectively eliminating transverse force, the arm returns into its rest position more easily and therefore with precision which is enhanced to the extent of the quotient relationship between the coefficients of rolling friction and sliding friction.

In this connection, there is also a slight rolling-contact displacement of the rollers relative to the guided part, i.e., to the bearing portion of the arm. A resilient adhesive, therefore, preferably retains the rollers on the guided part, the adhesive yielding within the involved slight ranges of rotational displacement. Another possibility for retaining the rollers in position is to contain them within elastically yieldable roller cages.

DETAILED DESCRIPTION

The invention will be illustratively described in further detail in conjunction with the accompanying drawings, in which.

Figure 2:
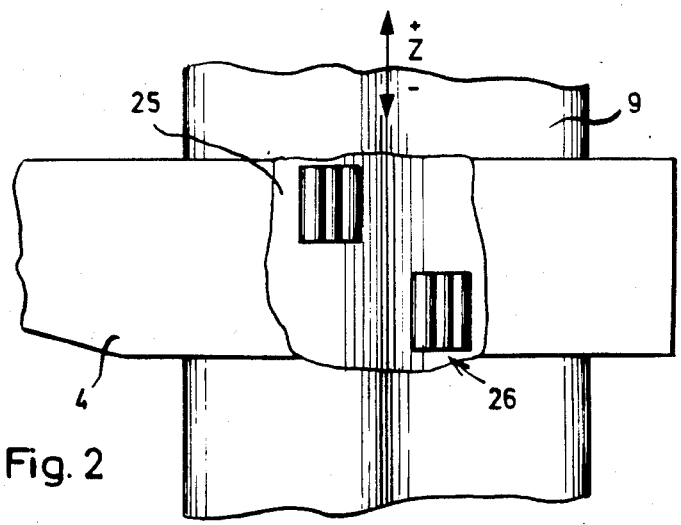
FIG. 2 is an enlarged fragmentary and partly broken-away side view to provide more detail of the guide column and guided arm of the tail-center portion of the cradle of FIG. 1.
Figure 3:
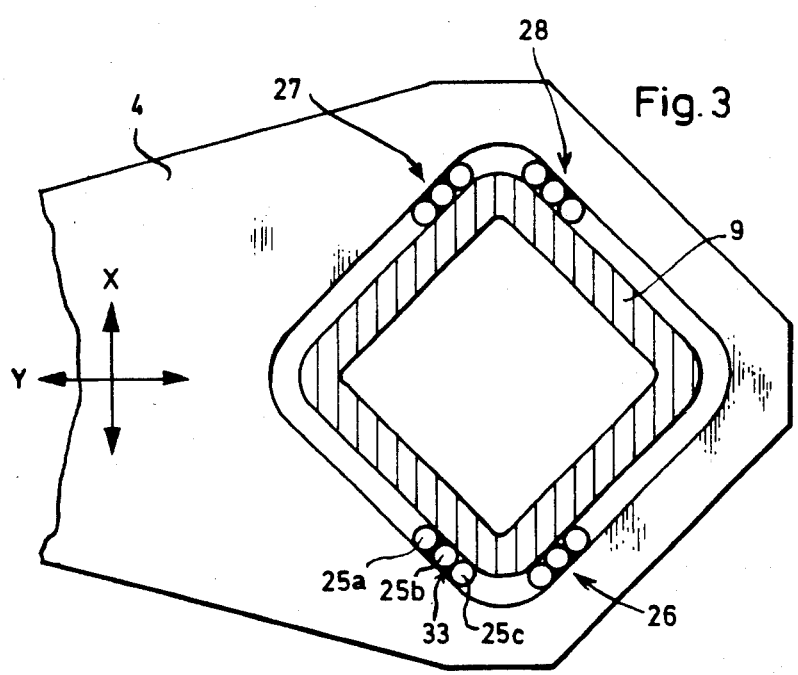
Figure 4:
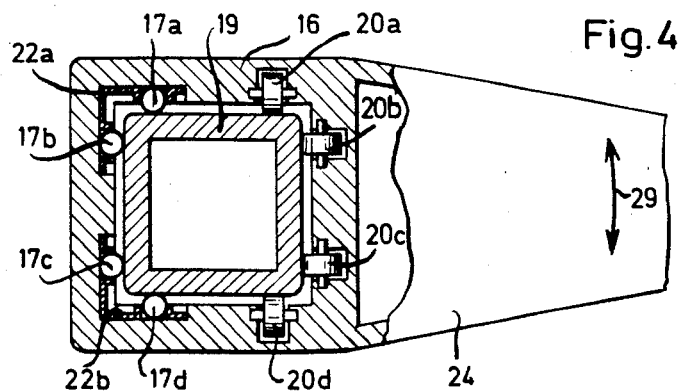
Figure 5:
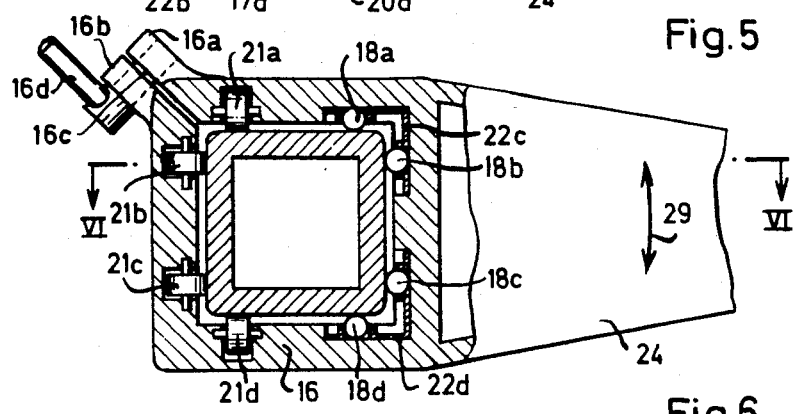
Figure 6:
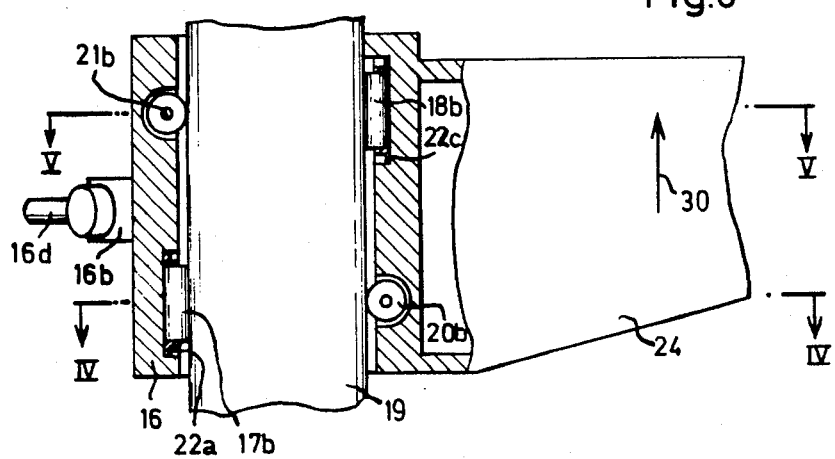

FIG. 3 is a similarly enlarged, fragmentary plan view of the structure of FIG. 2, in the plane perpendicular to the direction of guidance, and with the guide column in transverse section; and FIGS. 4 and 6 are sectional drawings directed to another illustrative embodiment of the invention, FIG. 4 being taken at the plane IV—IV of FIG. 6, FIG. 5 being taken at the plane V—V of FIG. 6, and FIG. 6 being taken at the plane VI—VI of FIG. 5.

Figure 1:
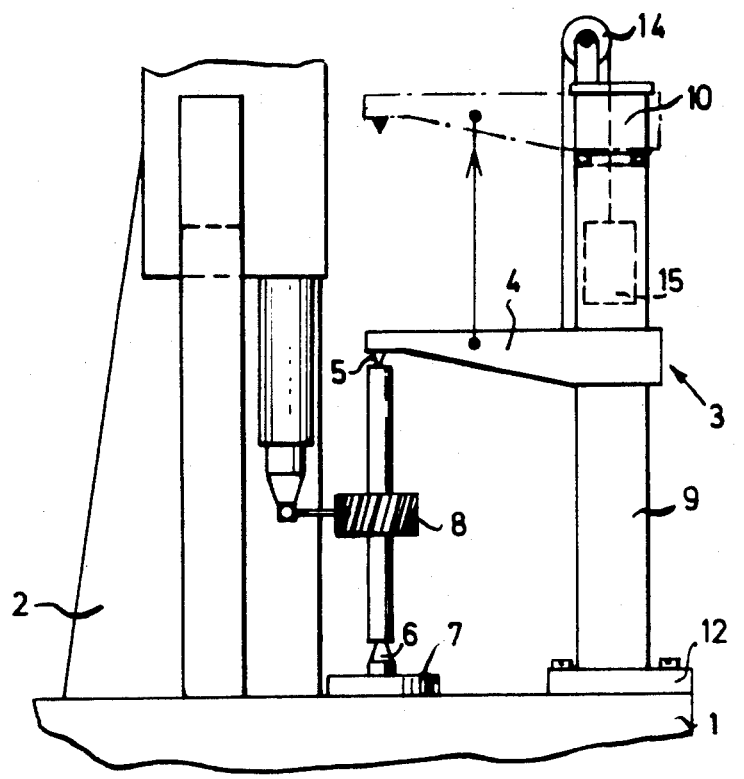
FIG. 1 is a side view in elevation of a center cradle mounted to a measurement machine.

The center cradle 3 shown in FIG. 1 is mounted by its base plate 12 on the flat horizontal work surface of a granite table 1 which supports the displaceable portal 2 of a multi-coordinate measuring machine.

The center cradle 3 comprises an upstanding hollow quadratic guide column 9 on which an arm 4 is readily displaceable in elevation, by reason of a roller 14 and a counterweight 15 which is movable within the guide column 9. The offset end of arm 4 mounts a tail center 5 in vertically spaced relation to a base center 6 which is mounted on a turntable 7 in the granite bed 1 of the machine. A workpiece 8 is retained by and between the centers 5 and 6.

The guidance of arm 1 is effected via a plain bearing which relies on bearing elements in the form of four groups 25-26-27-28 of three rollers each (FIGS. 2 and 3), the respective rollers of each group being separately identified by subordinate letter symbols, as at 25a-25b-25c. These rollers are arranged with their longitudinal axes parallel to the direction of guidance and are contained under initial (preload) stress in the clearance or slot between the guide column 9 and the surrounding bearing portion of arm 4. The rollers a-b-c of each group 25 to 28 are in each case retained to arm 4, via an elastic adhesive 33, thus making possible a practically frictionless, i.e., very exact, return of arm 4 to its position of rest after such incremental bearing-element rotation as may be due, for example, to forces which act transversely on the arm.

As a result of the staggered arrangement of the roller groups (trios) 25/27 and 26/28 of the front and rear bearing parts (see FIG. 2), as viewed from the center 5, self-locking of this bearing takes place when force is directed toward the center 5, i.e., in the process of chucking engagement of center 5 with the workpiece. A separate clamping of arm 4 against guide column 9 is thus not necessary.

Another illustrative embodiment is shown in FIGS. 4 to 6, wherein an arm 24 is selectively movable and lockable along a guide rail 19 of square-section.

Within the bearing portion 16, i.e., within the part of arm 24 which surrounds the guide rail 19, separate sets of four rollers 17a,b,c,d and 18a,b,c,d each are arranged in two planes, the longitudinal axes of said rollers extending parallel to the guide rail 19 and the rollers sliding thereon.

The rollers of sets 17 and 18 are retained, as by means of roller cages of sheet steel, to the bearing portion 16, each roller being resiliently positioned by opposed cage flanges which are characterized by a degree of compliant yieldability. End displacement of the rollers 17–18 in the cages is prevented by the thick-walled parts of the roller cages 22.

The four rollers 17a,b,c,d of the lower plane of the bearing and the four rollers 18a,b,c,d of the upper plane of the bearing are arranged on opposite sides (i.e., front and back, respectively) of the guide rail. And for each of these planes, ball-bearing casters 20b and 20c (21b and 21c) are located opposite rollers 17b and 17c (18b and 18c) respectively. In similar manner, laterally opposite ball-bearing casters 20a and 20d (21a and 21d) have front-to-back symmetry with respect to the laterally opposite rollers 17a and 17d (18a and 18d). In all ball-bearing casters, the axes of caster rotation are oriented perpendicular to the direction of guidance, so that all casters roll easily along guide rail 19.

As can be seen in FIG. 5, the upper half of bearing portion 16 has lug extensions 16a and 16b at opposite sides of a local slit, which enables selective clamping by means of a lever 16d and associated screw 16c, for drawing lugs 16a and 16b together. Upon loosening the clamp, arm 24 and its bearing portion 16 can be easily moved along guide 19.

Quite aside from the described selective clamp action, the guide system of FIGS. 4 to 6 acts in self-locking manner in one direction, namely, in the direction designated by the arrow 30 in FIG. 6, when the distance $a_K$ between the point of force application and the guide axis satisfies the condition:

$$a_K \geq L/2\mu$$

wherein L is the base length of the guide portion and $\mu$ is the coefficient of sliding friction, as between the rollers 17–18 and the guide rail 19.

No self-locking takes place for displacement force in the opposite direction, due to guidance by the rolling casters 21 and 22.

If transverse forces $F_Q$ (see arrow 29 in FIGS. 4 and 5) are applied in the direction to force the bearing portion 16 into rotation about the direction of guidance while the bearing portion 16 is in clamped condition, then the bearing portion incrementally twists while rolling on the elastically retained rollers 17 and 20, and clamping pressure builds in view of the stiffly compliant incremental increase in diameter of bearing member 16 which thereby occurs; when the transverse force $F_Q$ is relieved and eliminated, the stress of the compliant deformation forces the bearing back to its position of rest. Again, due to the rolling friction which thereby occurs between bearing portion and the guide, the position of rest is reproduced with high precision.

The described bearing systems will be understood to be suitable not only for guiding the arm of a center cradle but also for a number of other purposes. For example, reference may be had to use for the riders of optical benches, in which it is also important to maintain exact angular positioning of the optical elements mounted thereon.

What is claimed is:

1. Plain bearing for a part guided longitudinally on a guide rail (9, 19), rollers (25 to 28; 17, 18) being used at least in part in the bearing as plain-bearing elements whose longitudinal axes are aligned parallel to the direction of guidance, characterized by the fact that the rollers are resiliently retained on the guided part (4; 16) perpendicular to the direction of guidance.

2. A plain bearing according to claim 1, characterized by the fact that the rollers (25 to 28) are mounted by an elastic adhesive composition (33).

3. A plain bearing according to claim 1, characterized by the fact that the rollers (17, 18) are held in cages (22) having resiliently yieldable roller-engaged retaining walls.

4. A plain bearing according to claim 1, characterized by the fact that the rollers (17, 18) used as plain-bearing elements are combined with further bearing elements (20, 21) which roll in the direction of guidance.

5. A plain bearing according to claim 1, characterized by its use for guiding the displaceable arm (4) of a center cradle (3).

6. In combination, an elongate guide rail and a bearing of relatively short axial extent surrounding said rail with peripheral clearance and having one-way self-locking guided relation to said rail, the self-locking action occurring in the circumstance of at least a predetermined level of torque reacting between said bearing and rail to misalign the bearing axis in one direction from the guiderail axis, first and second sets of rollers within said clearance and in rolling contact with said rail and bearing, the axes of said rollers being parallel to the guide-rail axis, first means resiliently retaining rollers of the first set on said bearing near one end of said axial extent and within a first half of the periphery of the guide rail, and second means resiliently retaining rollers of the second set on said bearing near the other end of said axial extent and within the opposite half of the periphery of the guide rail.

* * * * *